Feb. 21, 1933.          C. D. PETERSON              1,898,140
            MAIN AND AUXILIARY GEAR SHIFTING MECHANISM
              Filed Dec. 24, 1931        4 Sheets-Sheet 4
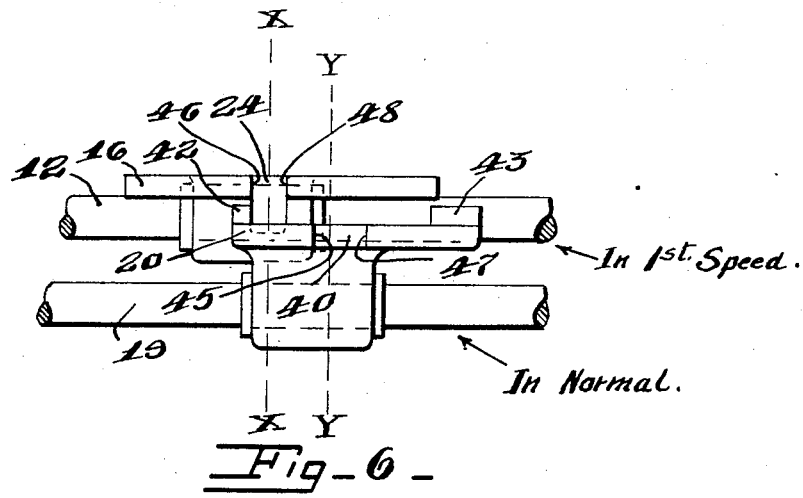
Fig-6-
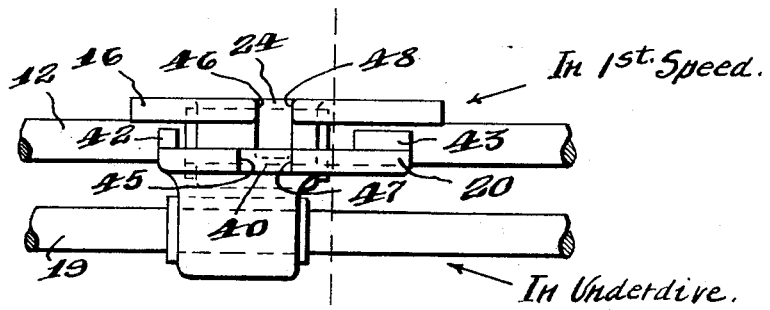
Fig-7-
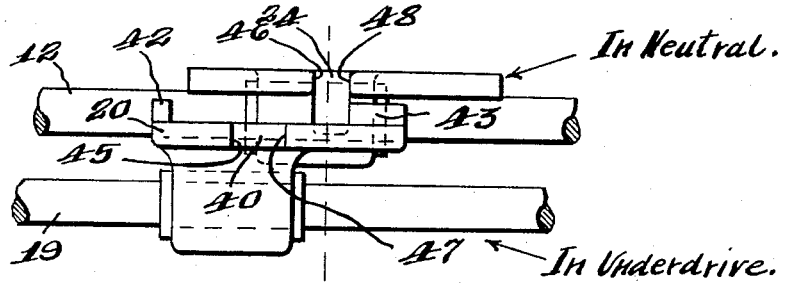
Fig-8-

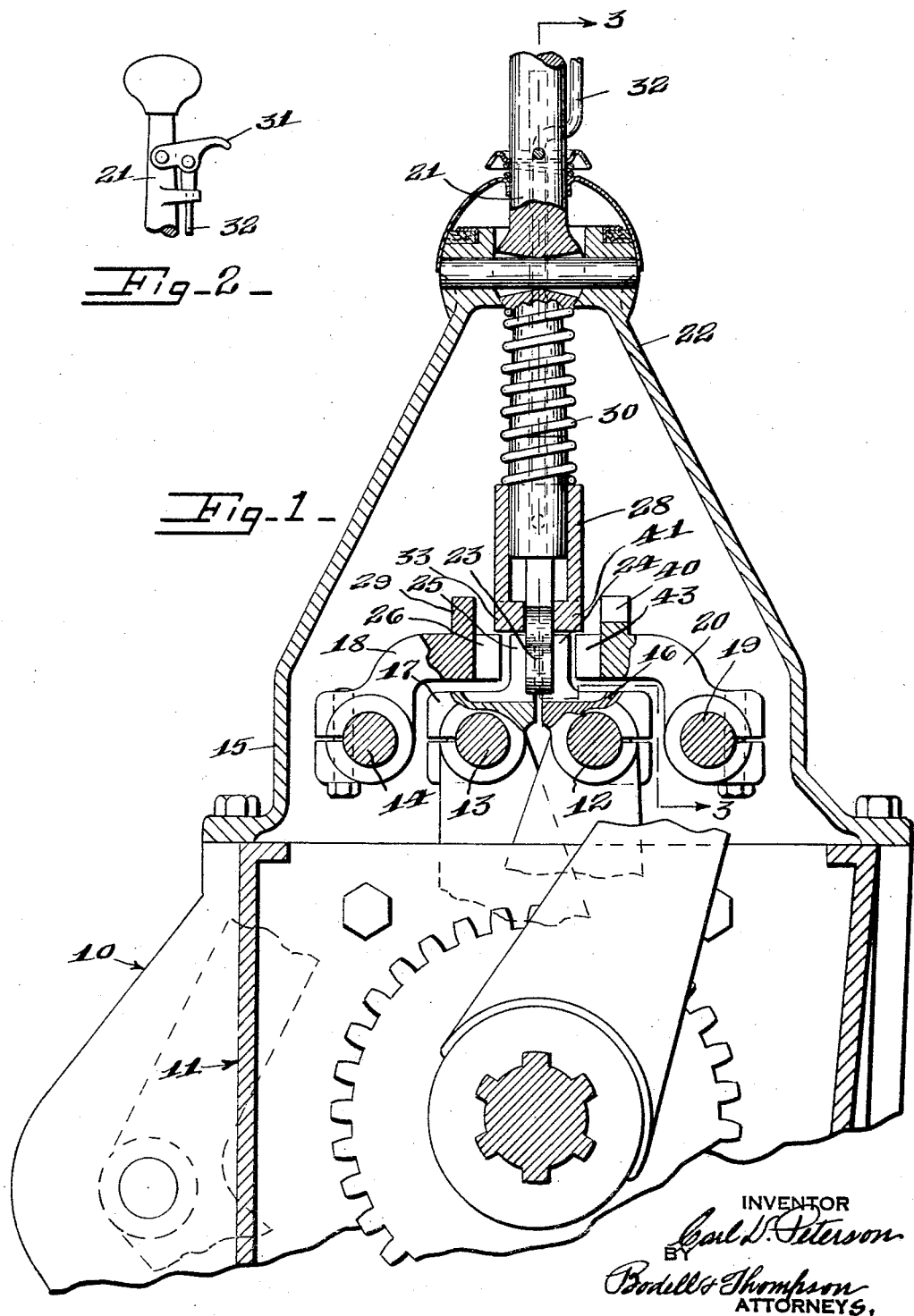

Patented Feb. 21, 1933

1,898,140

UNITED STATES PATENT OFFICE

CARL D. PETERSON, OF TOLEDO, OHIO, ASSIGNOR TO SPICER MANUFACTURING CORPORATION, OF TOLEDO, OHIO, A CORPORATION OF VIRGINIA

MAIN AND AUXILIARY GEAR SHIFTING MECHANISM

Application filed December 24, 1931. Serial No. 583,021.

This invention relates to operating mechanism for selective change speed transmission gearing of the type set forth in copending application, Sr. No. 546,726, filed June 25, 1931, in which a single gear shifting lever is utilized to shift the rods of a main gear set, and to also shift the rod of an auxiliary gear set, and it has for its object, a particularly simple and efficient construction by which the rod of the auxiliary gear set can be shifted when the rod, which effects first and second speeds of the main gear set, is in neutral, or shifted to one of its shifted positions, as first speed position.

In copending application, Sr. No. 546,726, all the rods of the main gear set must be shifted to neutral before the auxiliary rod can be shifted, and this invention lies in the construction wherein the auxiliary rod can be shifted when one of the main rods, as the adjacent low and second speed rod, is either in neutral, or shifted position, as low speed position.

The invention consists in the novel features and in the combinations and constructions hereinafter set forth and claimed.

In describing this invention, reference is had to the accompanying drawings, in which like characters designate corresponding parts in all the views.

Figure 1 is a transverse, sectional view of this gear shifting mechanism, the contiguous portions of the gear set being also shown.

Figure 2 is a detail view of the upper or handle end of the gear shifting lever.

Figure 6 is a fragmentary plan view illustrating one of the main shift rods, as the rod for effecting first and second speed in one of its shifted positions, as first speed position, and the auxiliary shift rod in normal position, or the same position shown in Figure 5.

Figure 7 is a view, similar to Figure 6, in which the auxiliary rod is in its shifted or under-drive position with the first and second speed main rod in first speed, as in Figure 6.

Figure 8 is a view, similar to Figure 6, in which the rod for effecting first and second speed is in neutral, and the auxiliary rod shifted to under-drive position, or in the same position shown in Figure 7.

This operating mechanism for selective change speed gearing includes a set of main shift rods for effecting speed changes in a main gear set, in the usual manner, independently of any changes in an auxiliary gear set, and an auxiliary shift rod paired with one of the main shift rods, usually the shift rod for effecting first and second speeds, a selecting and gear shifting lever having a lateral shifting movement to select any one of the shift rods, and a fore and aft movement to shift the selected rod, the lever and the first and second speed shift rod, and the auxiliary shift rod having coacting means by which the auxiliary rod can be selected and shifted not only when the first and second speed rod is in neutral position, but also, when the first and second speed rod is shifted to first speed position, and the auxiliary rod in normal position corresponding to neutral, or in its shifted position.

It will be understood that the auxiliary rod has no neutral position, and is normally in direct drive position, and that the main gear rods operate the same as in any selective change speed gearing, and are shiftable forwardly and rearwardly from a neutral position, and that before a change can be made from one to the other, all rods must be in neutral position. The main and auxiliary gear sets form no part of this invention, which relates solely to the gear shifting mechanism. It will be understood that an auxiliary gear set provides additional speeds, or multiplies the number of changes effected in the main gear set. For instance, if the main gear set has four forward speeds and reverse, the auxiliary set, when used in conjunction with the main gear set, would produce four additional speeds forward, and an extra reverse.

One form of main and auxiliary gearing is shown in the application before referred to, but as a complete understanding of this gear shifting mechanism can be had without a description of the gearing, a description of the gearing is thought to be unnecessary.

10 designates the main gear box, and 11 the auxiliary gear box.

Figure 3:
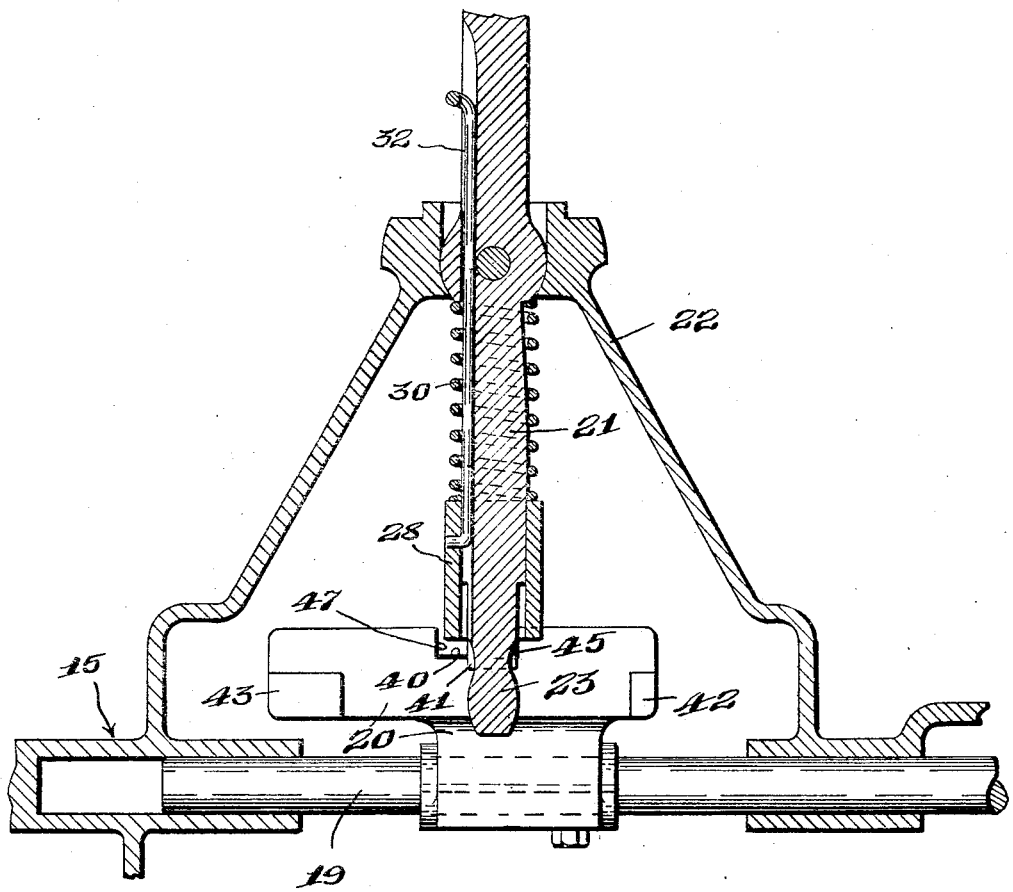
Figure 3 is a sectional view taken on approximately line 3—3, Figure 1.
Figure 4:
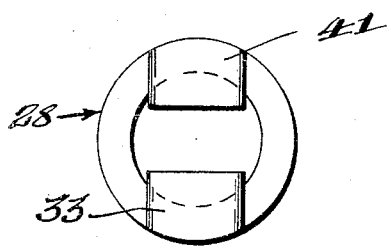
Figure 4 is an end view looking upwardly of the locking member or sleeve.

12, 13, and 14 designate the shifters for effecting the different speed changes in the main gear set in the usual manner. These shifters are usually sliding rods suitably mounted in the cap 15 of the gear box, as shown in Figure 3, and as having blocks 16, 17 and 18 provided with suitable forks connected to the shiftable elements of the main gear sets, and also with notches, to be presently described, for coacting with the selecting and gear shifting lever.

19 designates an auxiliary shift rod for effecting speed changes in the auxiliary gear set in the box 11, this also having a block 20 thereon provided with a fork, and with means for coacting with the gear shifting lever. The rod 12 is operable in opposite directions from neutral to effect first and second speeds forward in the main gear set, and the rod 13 shiftable in opposite directions from neutral to effect third and high speeds forward, and the rod 14 operable to effect reverse gear. The rod 19 is arranged adjacent and parallel to the rod 12 and extends rearwardly into the auxiliary gear box 11.

21 designates the gear shifting lever mounted, in the usual manner, in a suitable support or tower 22 to have a lateral selecting movement, and a fore and aft shifting movement, and having a finger 23 at its lower end for selectively engaging notches 24, 25 and 26 in the blocks 16, 17 and 18 of the rods 12, 13 and 14, the selecting and shifting of these blocks by the finger being practically the same as in any standard change speed transmission gearing.

28 is a locking member in the form of a sleeve slidable on the lower end of the shifting lever 21 and arranged to engage a barrier 29 on the block 18 for the reverse rod 14, and prevent unintentional engagement of the finger 23 with the notch 26 of the block 18. the sleeve 28 being pressed into its operative position by a spring 30 and operable against the action of the spring to lift the sleeve, or locking member 28, above the barrier 29 by a finger or grip lever 31 pivoted near the handle of the lever 21 and connected to the sleeve 28 by a link 32. The sleeve has a lug 33 for engaging the barrier, and the sleeve must be lifted high enough to permit the lug 33 to pass above the barrier 29 in order to permit the finger 23 to enter the notch 26 of the block 18 of the reverse shift rod 14.

The means by which the auxiliary rod 19 can be shifted when the rod 12 is in neutral, or in one, as low speed position, comprises a notch or slot 40 formed in the block 20 of the auxiliary rod 19 and arranged to receive a lug 41 at the lower end of the sleeve of the locking member 28, when the locking member is pulled upwardly against its spring 30, and the lower end of the lever 21 rocked laterally to the right, Figure 1, when the rod 12 is in neutral, or in its first speed shifted position, and spaced apart shoulders 42 and 43 on the block 20 for coacting with the finger 23 of the lever 21 to effect the shifting of the auxiliary rod 19 when the rod 12 is in a shifted position. The slot 40 is of greater width than the lug 41 and being so located that one end portion is in line with the lug to receive it, when the gear shifting lever and the rod 12 are in neutral, and the auxiliary rod 19 in its normal position, as seen in Figure 5, and the other end portion of the notch 40 is in line with the lug 41, as seen in Figure 7 when the first and second gear shift rod 12 is shifted rearwardly into first speed and the rod 19 is shifted to under-drive.

The lug 41 is here shown as of the same width as the notch 24, although it does not coact with the notch 24. In the drawings, the notch 40 appears as related to the notch 24. Thus, in Figure 5, where the rod 12 is in neutral position, and the rod 19 in its normal position, the side wall 45 of the notch 40 is alined with the side wall 46 of the notch 24, and when the shift rod 12 is shifted into first speed position Figure 7, and the rod 19 into a shifted position, as under-drive, the opposite wall 47 of the notch 40 is in line with the opposite wall 48 of the notch 24.

Figure 5:
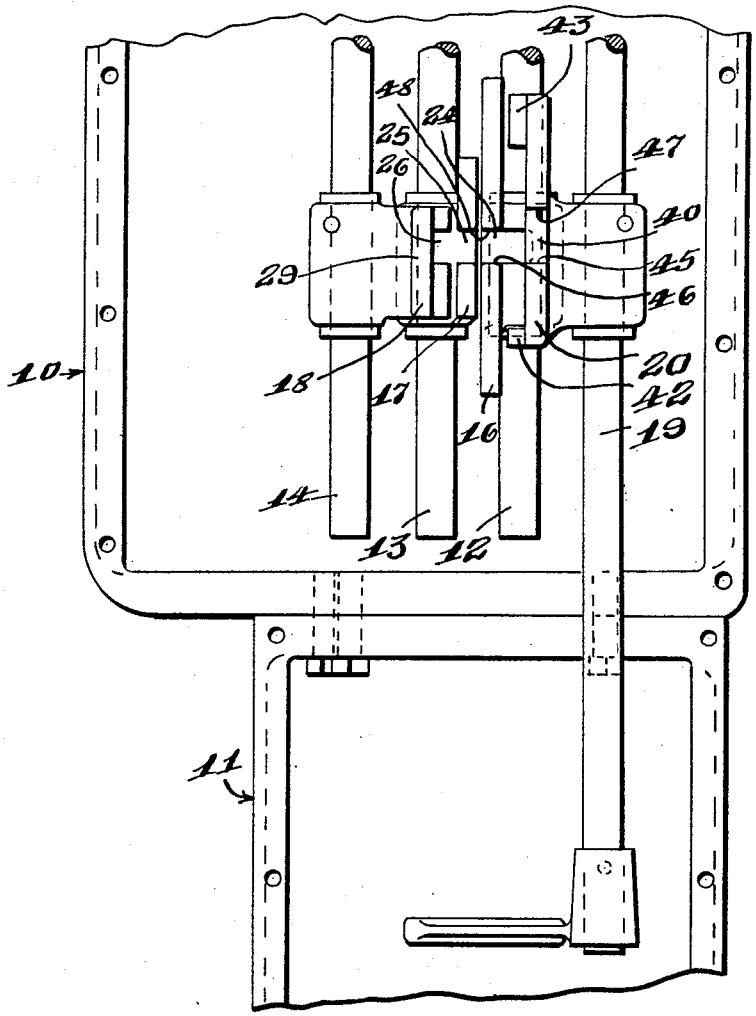
Figure 5 is a fragmentary plan view of the shift rods of this gear shifting mechanism, the contiguous portions of the gear boxes of a main or auxiliary gear set being also shown, the shift rods being shown in their normal position in which the rods of the main gear set are neutral, and the auxiliary rod in its direct drive or normal position.

When the rod 12 is in neutral position, as shown in Figures 1 and 5, the auxiliary rod 19 is shifted by operating the locking member 28 upwardly so that its lug 41 can enter the notch 40 and then, when the shifting lever 21 is rocked so that its lower end or finger 23 moves rearwardly, or to the right, Figure 3, the shoulder 43 is brought into alinement with the wall 48 of the notch 24 of the rod 12, as seen in Figure 8. Now, to leave the rod 19 in its shifted position and then engage any one of the rods 12, 13 and 14, the locking member or sleeve 28 is lifted upwardly to lift the shoulder 41 out of the notch 40, and the lever moved back to neutral position, and when the finger 25 encounters the shoulder 43, the operator knows by the feel of the lever that the lever is in neutral position, and he can then shift laterally into any one of the notches of the shift rods 12, 13, 14. If however, the shift rod 12 has been shifted into first speed position, and the auxiliary rod in normal, as seen in Figure 6, then the notch 24 has been moved so that its wall 46 is in alinement with the shoulder 42, so that now upon lifting of the locking member 28, the finger 23 can be shifted into engagement in front of the shoulder 42, and the lever shifted to shift the shift rod 19 into the position shown in Figure 7, the finger 23 thrusting against the shoulder. This shifting movement brings the notch 40 so that one of its walls, or end portion, is again alined with the notch 24 of the rod 12, so that when the gear shifting lever is shifted back toward neutral, the locking member 24 will snap into the notch 40 when the finger 23 is alined with the notch 24 of the rod 12, and the operator can then again reengage the shift rod 12 which is in first speed, shift it to neutral and make any other selection from neutral.

In Figure 7, the rod 12 is shown as shifted in first speed position, and the rod 19 is in its shifted position, and it is obvious that the rod 19 can be left in its shifted position and the return of the gear shifting lever made to the rod 12 which is in its first speed position, and this rod shifted to neutral and left in neutral if any of the other rods 13 or 14 are to be shifted.

As seen in Figure 8, when the rod 12 has been shifted back to neutral position, and the rod 19 is in its shifted position, one of the walls of the slot or notch 24 is alined with the shoulder 43, so that now, if the locking member 28 is lifted so that its lug 41 will lift up over the flange or barrier in which the notch 40 is provided, the lever 21 can be moved laterally far enough to let the finger 23 engage the shoulder 43, so that upon shifting of the lever 21, the rod 19 can be shifted back to its normal position, and having reached its normal position, the gear shifting lever can not be shifted back to neutral until the lock 28 again snaps into the notch 40, so that the operator knows by the feel of the lever 21 that it is in neutral position and be shifted into engagement with the rod 12. Thus, the rod 19 can be selected and shifted when the rod 12 is in neutral, or in its first speed position.

The shoulders 42, 43 are therefore spaced far enough apart to permit one or the other thereof to be in juxtaposition to the finger 23 when the auxiliary shift rod is in its normal position and the rod 19 is shifted into first speed from neutral. The shoulders 42, 43 are thus spaced equally along the rod 19 from the notch 40. The extent of the shifting movement of the first and second speed rod 12 to first speed from neutral is indicated by the distance between the lines X—Y Figure 6. The width of the notch 40 of the auxiliary shift rod 19 is of a width equal to the width of the lug which happens to be the width of the notch 24 of the main shift rod plus the difference in the length of movement of the auxiliary rod and the length of the movement of the first speed rod from neutral to first speed so that one end or the other of the notch 40 is alined with the notch 24 when the rod 12 is in neutral and the rod 19 in normal, or direct drive position, and when the rod 12 has been shifted into first speed position, or to the left Figure 7, or downwardly in Figure 5, and the rod 19 shifted to its shifted, or underdrive position. The notch 40 constitutes one gate for the shifting lever by means of which gate the auxiliary rod is shifted when the rod 12 is in neutral and the auxiliary rod 19 in normal or direct drive; and the recess between the shoulders 42, 43. A second gate by which the auxiliary rod 19 can be shifted when the rod 12 is in first speed position and the rod 19 in neutral, Figure 6, or returned to normal when rod 12 is in neutral and rod 19 in shifted position or under-drive.

The spacing of the shoulders 42, 43, as before set forth, permits the finger 23 to be brought against the shoulder 43 when the shift rod 12 is in neutral, and the auxiliary rod 19 in its operated, or under-drive position Figure 8, to shift the auxiliary rod back to normal, and also permits the finger to be brought in juxtaposition to the shoulder 42 when the shift rod is in first speed position Figure 6, and the auxiliary rod 19 in normal, or direct drive position Figure 6 to shift the auxiliary rod into under-drive. Thus, assuming that the auxiliary rod is in normal, or direct drive position, and the main gearing in say, fourth, or high speed position, and it is desired to use the auxiliary gear, the gear shifting lever 22 is operated to neutral position so that the rods are in their position shown in Figure 5, and the rod 19 selected by operating the sleeve 28 by means of the finger lever 31 to permit the lug 41 to pass over the barrier and into the notch 40 of the rod 19 whereupon the rod 19 can be shifted into the position shown in Figure 8 and then, the shifting lever returned forwardly to neutral until the finger 23 encounters the shoulder 43 and then, the gear shifting lever 22 can be shifted to select and shift any one of the other rods. If the gearing is to be again reset into high speed, or to use high speed in connection with the auxiliary speed, it might be necessary to progress through the rods 12 and 13 after the auxiliary shift rod 19 has been shifted out from its normal position as just described, so that the operator, in shifting from high gear to neutral, may prefer to shift the rod 12 into first or low speed position and therefore, we will assume that he shifts the rod 12 into low speed position before shifting the rod 19. Hence, when the operator reaches neutral position and selects the rod 12, he shifts it into the position shown in Figure 6 wherein the notch 24 is in juxtaposition to the shoulder 42 and then operates the locking member or sleeve 28 upwardly, so that the lug 41 can ride over on the barrier or flange, permitting the finger 23 to come in front of the shoulder 42. He can then shift the shift rod 19 rearwardly into the position shown in Figure 7 wherein the slots 24 and 40 are again in alinement and upon returning the shift lever, the lug 41 of the sleeve 28 will snap into the slot 40 from whence it can be lifted over the barrier and then, the operator can select and shift the rod 13, or any other rod, by going through neutral.

Now assuming that the auxiliary rod 19 is in its shifted position, and the operator desires to shift it back into direct drive position, and assuming that the main gearing is in high speed effected by the rod 13. The lever 22 is operated to neutral and of course, the rod 12 is in neutral, so that by lifting the sleeve 28 to cause the lug 41 to clear the barrier of the rod 19, the finger 23 can be brought into juxtaposition to the shoulder 43, as seen in Figure 8, and the gear shifting lever operated to return the rod 19 to its normal position, the finger 23 thrusting against the shoulder 43.

It is therefore, apparent that with the rod 12 in neutral, and the rod 19 in normal position, the rod 19 is shifted by means of the engagement of the lug 41 in the slot 40, and that the auxiliary rod may be shifted to neutral by the lug 41 engaged with the slot 40, or by the engagement of the finger 23 with the shoulder 43 when the rod 12 is in neutral position, as in Figure 8, or the rod 19 may be shifted by the engagement of the finger 23 with the shoulder 42 into shifted position when the rod 12 is in first speed position Figure 6. Thus, the rod 19 can be shifted when the rod 12 is in neutral, or in first speed, position.

What I claim is:

1. In a gear shifting mechanism for selective change speed transmission gearings, said mechanism including a main shift rod shiftable in opposite directions and having a fore and aft movement from neutral, an auxiliary rod shiftable endwise, the rods having blocks formed with notches, and the block of the auxiliary rod having a barrier for its notch, and shoulders located in front and in the rear of the notch of the auxiliary rod, and a selecting and gear shifting lever having a finger for selectively engaging one rod, and means for individually engaging the auxiliary rod and shoulders located in front and in the rear of the finger, the shoulders being spaced apart a greater distance than the length of said finger, and so located that the finger is in juxtaposition to one shoulder when the auxiliary rod is in normal direct drive position, and the other rod in a shifted position, and the other shoulder in juxtaposition to the finger when the auxiliary rod is in shifted position, and the other rod in neutral position, a shiftable lug on the gear shifting lever for entering the notch in the block of the auxiliary rod, and coacting with the barrier, and manually operable means for shifting the lug to move the same over the barrier.

2. A gear shifting mechanism for selective change speed transmission gearing including a plurality of shift rods, a single selecting and shifting lever for selecting and shifting said rods, said lever having a finger for selecting and shifting one of the rods, and a shiftable member having a lug for selecting and shifting the second rod when the first rod is in neutral position, and the second rod having spaced shoulders for coacting with the finger of the shifting lever to effect the shifting of the second rod when the first rod is in a shifted position, and when the second rod is in a shifted position and the first rod in neutral position.

3. A gear shifting mechanism for selective change speed gearing including a pair of shift rods provided with notches normally arranged in transverse alinement, the notch of the second rod being arranged at a different level from the notch of the first rod, and the block of the second rod having a barrier for normally preventing entrance to the notch of the second rod, and spaced apart shoulders extending between the rods in front of and in rear of the notch and below the barrier, and on the level of the notch of the first rod, a single selecting and shifting lever having a finger for entering the notch of the first rod and shiftable into the space between said shoulders, the shifting lever also having a member movable lengthwise thereof and having a lug for entering the notch of the second rod, and normally arranged below the level of said notch of the second rod and in line with the barrier, and means for operating said member to permit the lug to clear the barrier and enter the notch of the second rod and the finger to pass between the shoulders, the notch of the second rod being of such width that one side or the other is in line with the slot of the first rod when the first rod is in neutral position and the second in normal, and when both rods are in shifted position, and the shoulders being so spaced that one or the other is alined with one side of the slot in the first rod when the auxiliary rod is in shifted position out of normal, or in normal, and the first rod in one of its shifted positions.

4. A gear shifting mechanism for selective change speed transmission gearing including a pair of shift rods, and a single selecting and shifting lever for shifting said rods, the rods having blocks thereon formed with gates, and the lever having a single finger for coacting with the gates to select one or the other of the rods, the gate of one of the rods being of sufficient width to slidably receive and slidably fit the finger, and the gate of the second rod being of sufficient width so that one end wall or the other thereof is alined with the gate of the first rod when the first rod is in neutral position, and the second in neutral, and in shifted position, whereby the lever can be operated to return to neutral position and leave the second rod in shifted position.

5. A gear shifting mechanism for selective change speed transmission gearing including a pair of shift rods, and a single selecting and shifting lever for shifting said rods, the rods having blocks thereon formed with gates, and the lever having a single finger for coacting with the gates respectively to select one or the other of the rods, the gate of one of the rods being of sufficient width only to slidably receive and fit the finger, and the gate of the second rod being elongated and of a greater width than the finger, and of sufficient width to have one end or the other of the elongated gate in neutral position when the second rod is in shifted and in neutral position, whereby the shifting lever can be returned to neutral position when the second rod is in shifted position.

6. A gear shifting mechanism for selective change speed transmission gearing including a pair of shift rods, and a single selecting and shifting lever for shifting said rods, the rods having blocks thereon formed with gates, and the lever having a single finger for coacting with the gates respectively to select one or the other of the rods, the gate of one of the rods being of sufficient width to slidably fit and receive the finger, and the gate of the second rod being elongated and of sufficient width so that one end wall, or other thereof, is alined with the gate of the first rod when the first rod is in neutral position, and the second rod in neutral or in shifted position, whereby the lever can be operated to return to neutral position and leave the second rod in shifted position, the block of the second rod being provided with a barrier, and a manually operated lock on the shifting lever normally coacting with the barrier to prevent selecting of the second rod, and operable to clear the barrier to permit selecting of the second rod, the barrier having a gate and a locking member having a tooth for interlocking therewith when the locking member is operated to clear the barrier.

In testimony whereof, I have hereunto signed my name at Toledo, in the county of Lucas, and State of Ohio, this 22nd day of Dec., 1931.

CARL D. PETERSON.